Figure 1:
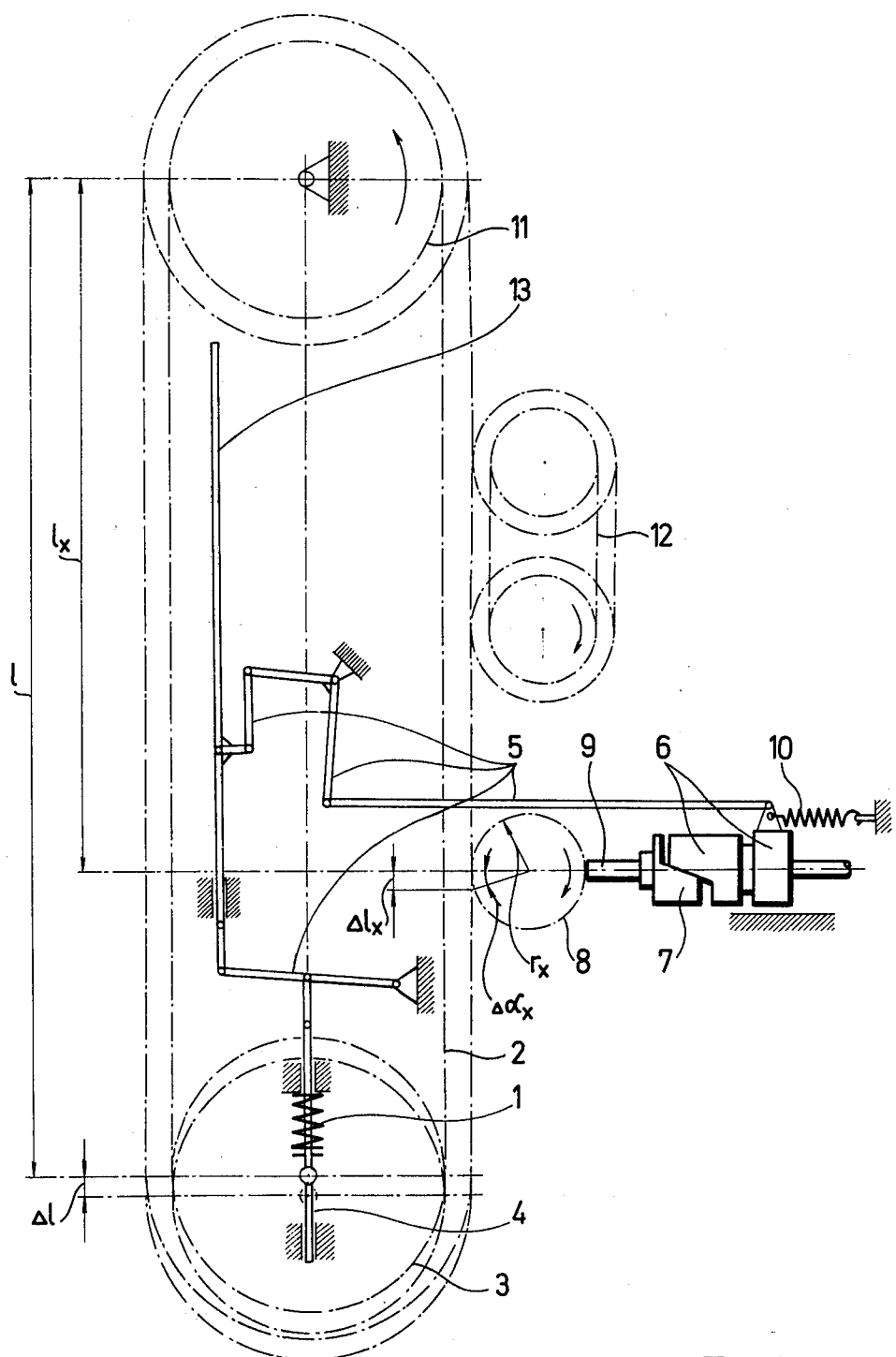

United States Patent [19]
Gaál

[11] 4,013,163
[45] Mar. 22, 1977

[54] PHASE ADJUSTMENT APPARATUS

[75] Inventor: Ottó Gaál, Budapest, Hungary

[73] Assignee: Egyesult Izzolampa Es. Villamossagi Resveny tarsasag, Budapest, Hungary

[22] Filed: Nov. 17, 1975

[21] Appl. No.: 632,295

[52] U.S. Cl. .............................. 198/575; 198/576; 198/814

[51] Int. Cl.² .................................... B65G 37/00

[58] Field of Search ............ 198/76, 103, 208, 575, 198/814, 576; 318/11, 12; 226/40, 41

[56] References Cited

UNITED STATES PATENTS

| | | | |
|---|---|---|---|
| 2,076,202 | 4/1937 | Lewellen et al. | 318/11 X |
| 2,677,456 | 5/1954 | McCann | 198/208 X |
| 2,852,130 | 9/1958 | Wallace | 198/208 |
| 2,920,503 | 1/1960 | Burrows | 198/76 X |
| 2,932,376 | 4/1960 | Millington | 198/19 |
| 3,033,346 | 5/1962 | Gardiner | 198/76 |
| 3,045,805 | 7/1962 | Shappell | 198/76 |
| 3,326,436 | 6/1967 | Huck | 226/41 X |
| 3,757,924 | 9/1973 | Yakubek | 198/19 |
| 3,818,290 | 6/1974 | Harper et al. | 198/19 X |
| 3,833,843 | 9/1974 | Bossons | 318/11 |

FOREIGN PATENTS OR APPLICATIONS 141,435   11/1960   U.S.S.R. .............................. 198/19

Primary Examiner—Evon C. Blunk
Assistant Examiner—Richard K. Thomson

[57] ABSTRACT

The invention concerns a device for maintaining the relative phase shift between an endless conveyor and a rotary or rotatingly indexing table and/or additional conveyors attached thereto, wherein the endless conveyor has a fixedly journalled drive wheel and a displaceably journalled tensioning wheel, process tools e.g. holders, jaws and similar fixtures being attached to the conveyor at equal spacing along its length and being associated with the rotary or indexing tables and/or additional conveyors elements driven synchronously, by means of a common drive, with the conveyor, the drive shafts of the table(s) and/or additional conveyors being linked by a shaft coupling, consisting of an axially fixed sleeve and an axially movable sleeve, the sleeves having complementary helicoidal bearing surfaces with a predetermined pitch of thread, and a transmission, a predetermined transmission ratio connecting the displaceably guided bearing of the sprocket wheel and the axially movable sleeves of the shaft coupling.

5 Claims, 4 Drawing Figures

PHASE ADJUSTMENT APPARATUS

The invention concerns a device for keeping constant the relative phase difference between an endless conveyor and an associated rotary table or a rotary indexing, i.e. intermittently rotating table and/or additional conveyors, wherein the endless conveyor has at least one drive wheel with a shaft of fixed position and one freewheeling guide sprocket which is journalled in a spring-loaded, displaceable element to constantly tension the conveyor. The conveyor may be driven continuously or intermittently and is fitted along its length with equidistantly attached elements e.g. heads, cups, jaws, etc., which are associated with rotary or rotary indexing tables and/or additional conveyors by means of a common synchronous drive. Experience with recently developed continuously moving conveyorised automatic assembly lines has shown that such permanently tensioned endless conveying elements are subject to a change in length that varies with time, due to wear of its constituent elements such as chain links, joints and hinges, as a result of the permanent tensioning forces and further due to temperature changes connected with the technological processes involved.

Such variations may be quite considerable, depending on the length of the conveyor.

This problem has a particular significance in the case of continuously moving assembly lines involving a number of process operations utilising heat, e.g. modern automated production assembly lines for the manufacture of light sources, particularly general lighting service lamps, fluorescent tubes etc. Such continuously moving production conveyors have, along their length, equidistantly mounted holder units for conveying he semiproducts and/or components of such light sources from one assembly operation to the next until the assembly of the light source is completed. Generally such conveyors are chain conveyors. Due to the differing temperature ranges to which the components to be assembled are subject in the course of the production of light sources, varying and significant changes in the length of the chain occur and such variations are increased by the wear of the chain elements i.e. chain links and hinges and by the effect of the permanently present tensioning forces applied to the chain.

A precondition of a reliable and accurate functioning of this automatic assembly complex is the maintenace of the rate of tensioning of the chain constant, which in known manner is achieved by a spring-loaded slidable journalling of one — preferably the driven sprocket.

Along the path of the conveyor there are various processing tools, mechanisms and fixtures attached which actuate and carry devices taking part in the technological process, and which are driven synchronously with the conveyor, prefereably from a common drive due to the requirements with regard to the kinematic rigidity of the plant. The common drive is also desirable to prevent slippage to meet the strict quality requirements of the light source; the maintenance of geometrically accurate positioning of the processing tools in relation to the conveyor, and even more, to the holders of components attached to the conveyor, is an absolute necessity.

The main problem involved is that the relative positions of the conveyor and of the rotary or indexing tables and/or additional conveyors attached to the conveyor on which the processing tools are mounted, are displaced or shifted, i.e. the positional accuracy is impaired due to the above-explained variations in the length of the conveyor in a measure corresponding to the magnitude of such fluctuations of the length of conveyor, thus rendering the correct functioning of the system difficult; when certain limits are exceeded, operation becomes practically impossible. The above-described problem has only recently manifested itself in the process of the development of modern, high-speed, continuously operated assembly lines for the manufacture of incandescent lamps, and thus far no practically usable technical measure has become known for overcoming it, i.e. for constant adjustment and thus for maintaining a constant phase between a conveyor of constantly varying length and meshing devices associated with the conveyor.

The solution of this problem by the invention is based on the discovery of the fact that it is possible to correct and readjust the phase shifts in the relative position, or timing, of the movements of the conveyor and the kinematically connected and coordinated rotary or rotary indexing tables and/or additional conveyors to at least approximately zero by continuously sensing and registering the variations in the length of the transport conveyor and by feeding them back to the synchronously driven tables and/or additional conveyors at a ratio of feedback transmission functionally related to their relative distance from the transport conveyor drive wheel, in an advancing or lagging sense.

In this way the task underlying the invention is solved, in that the device embodying this invention consists of introducing shaft couplings into the drive shafts of the rotary or indexing tables and/or additional conveyors, each shaft coupling consisting of a sleeve that is stationary in an axial direction and an axially movable sleeve, both sleeves being supported against each other by a helicoidal surface of predetermined pitch of thread, and, in that a connecting linkage of predetermined transmission ratio is provided to link a displaceable bearing element of the sprocket wheel and the axially movable sleeve(s) of the shaft coupling(s).

In a preferred embodiment of the apparatus according to the invention the linkage system is a kinematically rigid linkage consisting of a tie rod which is pivotally connected to the bearing element of the sprocket wheel acting in a plane parallel with the axis of rotation of the sprocket wheel and of the drive wheel, and push rod(s) connecting the tie rod with the axially movable sleeve(s) of the shaft coupling(s).

Particularly where production lines of substantial dimensions are used it is advantageous to use a hydraulic or hydropneumatically operated adjustment device in place of the mechanical linkage described above, such device having at least one actuator connected to the slide bearing and a respective adjusting element coupled to the or each of the axially displaceable sleeve(s) of the shaft coupling(s).

In accordance with the invention concept, the fluctuations in the length of the conveyor are proportionally and continuously located and transferred by means of the rod system or another mechanism of any desired type to axial displacement of the shaft coupling sleeves by a functionally related magnitude. Due to the helicoidal bearing surfaces of the coupling sleeves the axially sliding movement is converted into a corresponding angular displacement of the fixed sleeve and thus of the rotary or indexing table(s) and/or additional conveyors, relative to their previous angular position.

The invention thus ensures a continuous compensation for phase shift of the processing tools and component holders mentioned above to an approximately or substantially zero phase shift, set initially in cold condition of the transport conveyor.

Figure 2:
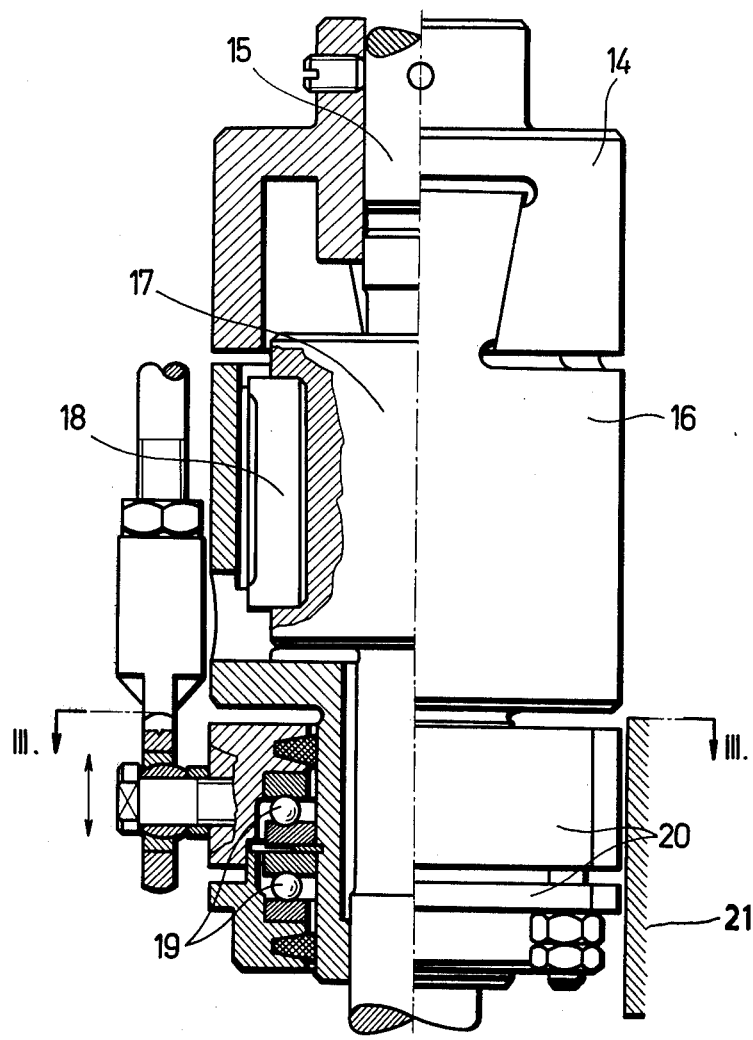
Figure 3:
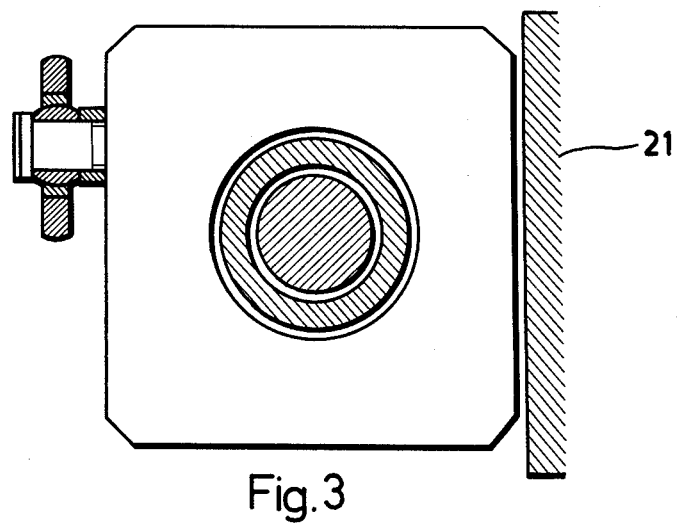
Figure 4:
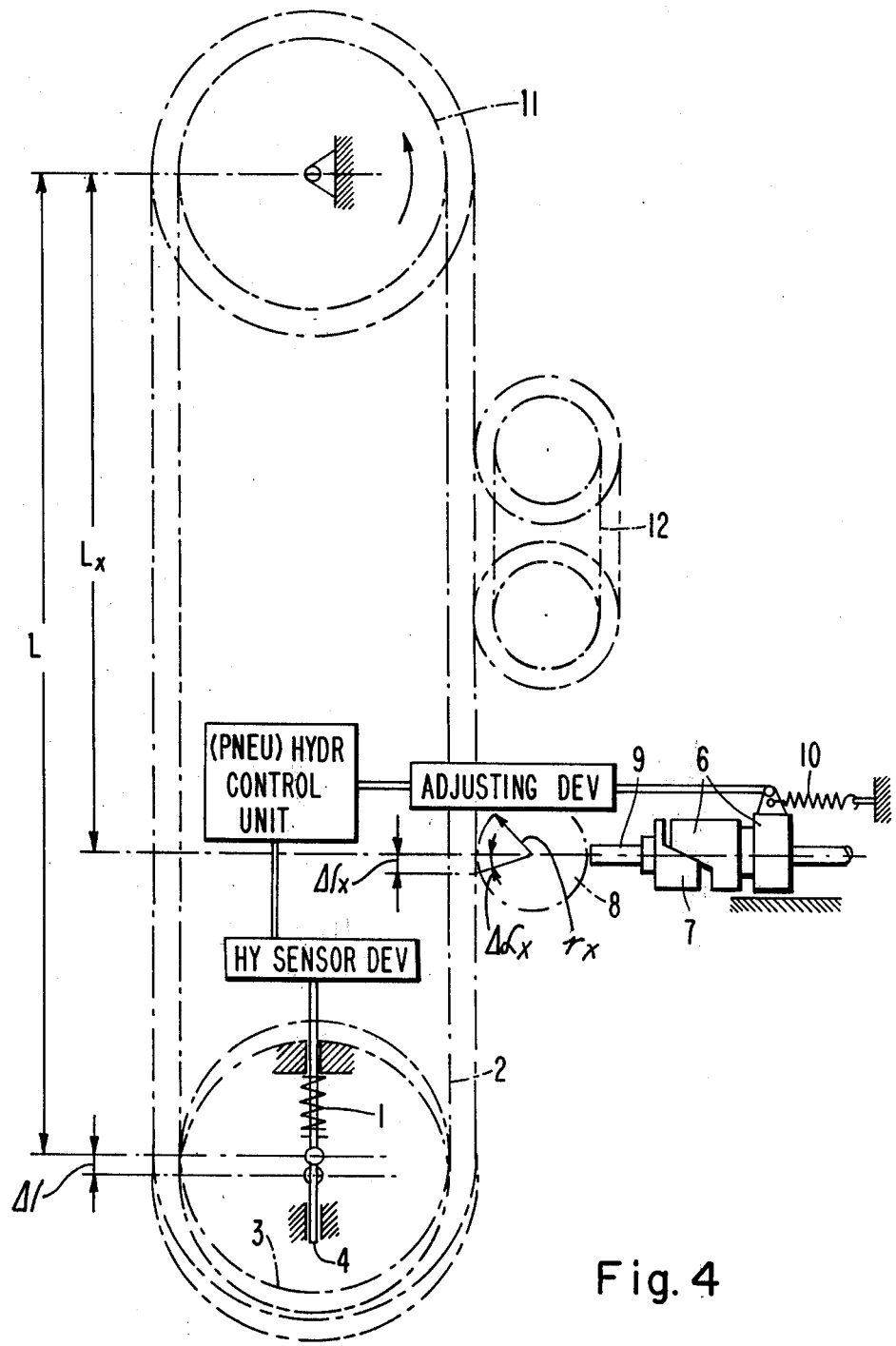

Further details and characteristics of the invention are given in an embodiment of the invention illustrated by the accompanying drawings, wherein:

FIG. 1 shows a layout of the kinematic principle of an exemplary embodiment of the device according to the invention, FIG. 2 is a half-elevational, half-sectional view of a shaft coupling of the device according to the invention, FIG. 3 is a section across the shaft coupling along the plane III—III of FIG. 2, FIG. 4 is another embodiment including a phrase shift adjusting mechanism.

In the embodiment shown in FIG. 1 a conveyor in the form of an endless chain conveyor 2 is driven by a drive wheel 11 journalled with a stationary axle bearing around a sprocket wheel 3 which is mounted for freewheeling, is pre-tensioned by a spring 1 and is guided for linear movement in a slide bearing 4. On the conveyor 2 there are equidistantly spaced, non-illustrated elements for receiving, holding and transporting semi-finished products. The said elements are adapted to cooperate in a positonally and timewise accurate manner with non-illustrated tools, e.g. metering and/or processing units located at certain technological sections of the transport path, e.g. at a rotary table 8 and a further conveyor 12.

If the conveyor 2 is moved continuously, the rotary table 8 and the conveyor 12 are also continuously moved at the same velocity. If the conveyor moves intermittently i.e. indexes, the rotary table 8 and conveyor 12 are caused to index synchronously with it.

FIG. 1 shows that a change in the length of conveyor 2 causes a corresponding displacement $\Delta l$ of the axis of the sprocket 3 due to the fact that the slide bearing 4 of the sprocket wheel is spring-loaded. Consequently, the light source holding chain attachments of the transport conveyor 2 will exhibit, at a point spaced by $l_r$ from the fixed drive wheel shaft a phase advance of $\Delta l_r$ (proportional to $\Delta l$) between the initially accurately positioned process tools associated with the rotary table 8 and the attachments of the chain conveyor.

Thus the originally adjusted positionally accurate engagement is no longer present.

According to the invention such phase shift(s) may be corrected or compensated to zero rating by changing the angular position of the process tools mounted on the rotary table 8 at a radius $r_r$ by adding phase-advancing angular displacement $\Delta \alpha_r$, such that, measured along the circumference of the rotary table 8, $\Delta l_r = r_r \Delta \alpha_r$, whereby to given an approximately accurate engagement.

The device embodied in this invention and performing this correcting action automatically consists of a drive shaft 9 of the rotary table 8 and a shaft coupling with an axially fixed sleeve 7 and an axially slidable sleeve 6, the sleeves having similar helicoidal bearing surfaces bearing with a pitch of thread of $m$. Between the axially slidable sleeve 6 and the bearing 4 of the sprocket wheel 3 there is a connecting transfer rod system with a transmission ratio $i_r$ and comprising a push rod 13 and linkage 5.

It will be shown herebelow that the relative phase between conveyor 2 and a point of action of the rotary table 8 will remain constant to an approximation that is sufficient in practice, notwithstanding variations in the length of the conveyor 2 by the above-described device embodied in the invention by means of a correct selection of its design parameters, particularly of the transmission ratio $i_r$.

In FIG. 1 the following are given:
the initial nominal axial length, centre to centre of the conveyor, $l$,
the distance $l_r$,
the radius $x_r$; and further,
the pitch of thread $m$ of the helicoidal bearing surfaces of sleeves 6 and 7 of the shaft coupling.

It can be proved that the transmission ratio of the linkage $l_r$ required at any given time defined and computed by the correct selection of the design parameters. The condition of the desired phase shaft compensation may be written as $$\Delta l_r \approx r_r \cdot \Delta \alpha_r \qquad (1)$$

from the design parameters and by the empirically proportional variation in the length of the conveyor, it follows that $$\frac{\Delta l}{\Delta l_r} = \frac{l}{l_r} \qquad (2)$$

if Kx is the axial shift of the sleeve corresponding to the displacement $T_r \cdot \Delta \alpha_r$, then:

$$\frac{\Delta \alpha_r}{2\pi} = \frac{K_r}{m} \qquad (3)$$

The transmission ratio of the linkage is $$i_r = \frac{K_r}{\Delta l} \qquad (4)$$

and from (3)

$$K_r = \frac{\Delta \alpha_r}{2\pi} \cdot m \qquad (5);$$

substituting $\Delta \alpha_r$ from (1) into (5), one obtains $$K_r = \frac{\Delta l_r \cdot m}{2\pi \cdot r_r} \qquad (6)$$

and from (2), $\Delta l$ can be expressed as $$\Delta l = \frac{l \cdot \Delta l_r}{l_r} \qquad (7)$$

and substituting equations (6) and (7) into (4), the result is:

$$i_r = \frac{m \cdot l_r}{2\pi \cdot l \cdot r_r} \qquad (8)$$

In other words, it is possible to solve the problem of correcting a phase shift between a conveyor 2 with a total centre-to-centre length $l$ and a process tool rotating along a circular track with radius $x_r$ on a rotary table 8 and/or on an additional conveyor 12, which table and/or additional conveyor being positioned at a distance $l_r$ from the centre of the sprocket wheel of the conveyor by designing a linkage 5 with a transmission ratio $i_r$ whereby to achieve the underlying aim of the invention.

FIG. 2 and FIG. 3 show the design of an exemplary embodiment of a shaft coupling. On a driven shaft 15 of a rotary or indexing table and/or of any additional endless conveying element, there is an axially fixed sleeve 14 with a helicoidal surface of thread pitch $m$. On the end of a driving shaft 17 of the shaft coupling there is an axially slidable sleeve 16 which is prevented from turning relative to the shaft by a feather key 18, the sleeve 16 also having the same pitch of thread $m$ of its helicoidal bearing surface.

The sleeve 16 is moved axially by means of a dog or carrier attachment 20 which has a fixed flat guiding surface 21 ensuring its twist-free movement and which is journalled in a ball bearing 19 around the sleeve 16. As already has been shown above, an axial sliding movement of sleeve 16 results in an angular displacement (phase shift) between the shafts 15 and 17, (which otherwise can be considered as rotating together), the size of which is determined by the pitch $m$ and by the magnitude of the axial displacement, while the kinematically rigid driving engagement of these shafts being always maintained.

The maintenance of a constant magnitude of the relative phase shift between a conveying element and a rotary or indexing table(s) and/or additional conveying element(s) associated therewith is relatively simply and extremely reliably ensured, according to the invention, despite fluctuations in the length of the conveying element.

Instead of mechanical linkages, one may according to the invention utilize other phase regulating means e.g. hydraulic or hydro-pneumatic linkages, to ensure a predetermined transmission ratio. These are particularly advantageous in case of systems of very large dimensions.

We claim as our invention:

1. A device for maintaining the relative phase shift between an endless conveying element and at least one rotary work table comprising at least one fixedly journalled drive wheel, a tensioning wheel, and a resiliently loaded, displaceable and guided bearing for the tensioning wheel for the endless conveying element, process tools attached to said endless conveying element at equal spacing along its length, means for driving said at least one rotary table synchronously with the said endless conveying element, the drive means including a drive shaft for the said at least one rotary table, at least one shaft coupling for said drive shaft consisting of an axially fixed sleeve and an axially movable sleeve, complementary helicoidal bearing surfaces with a predetermined pitch of thread on said fixed and movable sleeves, and a transmission with a predetermined transmission ratio connecting the displaceably guided bearing of the tensioning wheel and the axially movable sleeve of the shaft coupling.

2. A device according to claim 1, wherein the transmision is constructed as a kinematically rigid linkage system consisting of a tie rod articulated to said bearing of the tensioning wheel and linearly guided in a plane parallel with the plane containing the axis of rotation of the tensioning wheel and of the drive wheel, and further consisting of additional link rods linking the time rod with the axially movable sleeve of the shaft coupling.

3. A device according to claim 1 wherein the transmission is a hydraulically operated phase shift adjusting mechanism comprising at least one locating member connected with said bearing and a respective adjusting element connected with the axially movable sleeve of the shaft coupling.

4. A device according to claim 1, wherein there is a further shaft coupling, an axially slidable sleeve in said shaft coupling which is secured against rotation, a shaft on the driving side, a feather key for mounting and carrying said sleeve on said shaft; a bearing around the sleeve, and a dog journalled in the said bearing around the sleeve for moving in the axial direction with the sleeve; a fixed guide member and a flat guiding surface formed on the dog and lying against the fixed guide member.

5. A device according to claim 1 wherein said rotary table is an indexing table.

* * * * *